Patented July 30, 1935

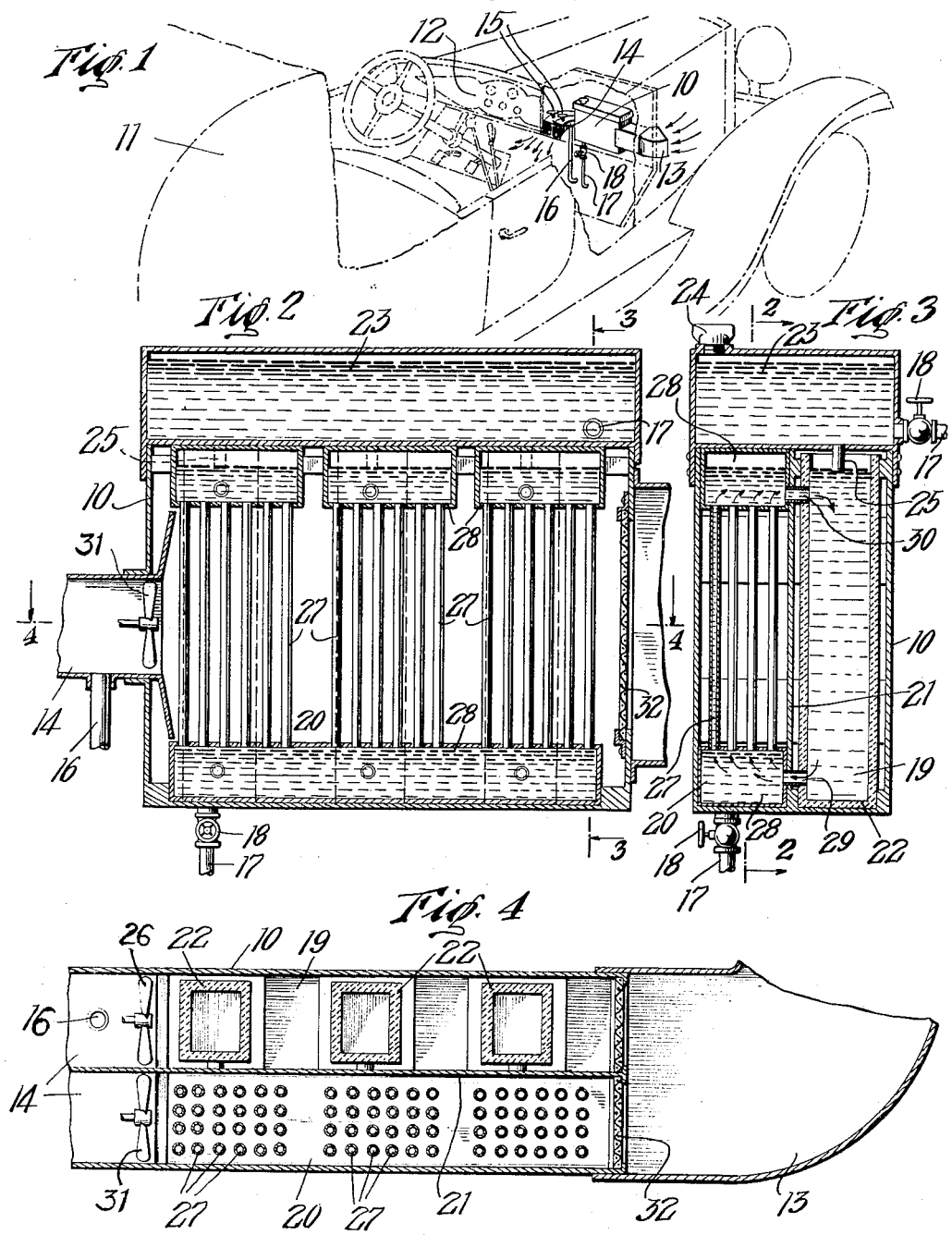

2,009,550

UNITED STATES PATENT OFFICE 2,009,550

AIR CONDITIONER FOR AUTOMOBILES

Gordon D. Harris, Freeport, N. Y., assignor to Harris Auto-Car Air Conditioner Corporation, New York, N. Y.

Application April 28, 1934, Serial No. 722,856

3 Claims. (Cl. 257—7)

The objects of the invention are: To provide an air-conditioning device for use in automobiles for selectively introducing thereto cool-dry, humidified, and warm air, depending on the season of the year; to utilize warm water from the water system of the automobile for heating the interior of the car in the winter; to permit entry of outside air to pass into the device and be circulated thereby into the interior of the car; to provide a reservoir with the air-conditioning device to be utilized during the summer; to provide means for discharging and/or shutting off one compartment of the device; and to secure simplicity of construction and operation.

Drawing:

Figure 1 is a perspective view of an automobile shown in broken lines, and showing my improved air conditioning device therein;

Figure 2 is a longitudinal sectional view of the device shown as taken on the line 2—2 of Figure 3;

Figure 3 is a vertical section shown as taken on the line 3—3 of Figure 2; and

Figure 4 is a transverse sectional view shown as taken on the line 4—4 of Figure 2.

Description:

As seen in the drawing, the present invention is particularly directed to use in automobiles, and referring more particularly to Figure 1, it will be seen that the device 10 is attached to the inside of an automobile 11 under the cowl. Preferably, it is placed on the inside of the dashboard between the same and the instrument board 12. Said device in its operating condition is provided with an intake duct 13 conveniently projecting from the side of the vehicle body and there directed forwardly and providing for air from the outside to enter the air-conditioning device 10 under forced draft due to movement of the vehicle.

On the inside of the car and on the opposite side of the device from the inlet duct 13, is provided outlet means, here shown as two outlet ducts 14, 14 through which conditioned air may be permitted to circulate within the car. One of these ducts is an outlet for dry-cooled air, whereas the other is for humidified air. These said ducts 14, 14, preferably are provided with valves 15, 15, and by virtue of said valves, either dry cooled air, or humidified air may be allowed to circulate within the car. Should only a dry cooled air be desired, the valve controlling the humidified or damp air is closed, and in this case, the damp air then passes out of the car by utilization of a discharge pipe 16 having its open end on the underside of the usual floor-board of the car.

By utilization of pipes 17 having valves 18, the air-conditioning device may conveniently be used for supplying heated air during the winter. Circulation of hot water from the water line from the radiator of the car and the engine (not shown) is utilized by tapping the same with the tube-like pipe 17 and then circulated through the device 10, and the water then discharged back into the radiator and engine (not shown) by another pipe 17 conveniently attached to the back of the device hidden from view. The inflow and outflow of the hot-water is manually controlled by the said valves 18.

Referring now more particularly to the structure of said device 10, I have shown the same as preferably rectangular in shape and divided into a plurality of sections. In the present showing, there is shown two such sections, namely, a front section 19 and a rear section 20, separated by a partition 21, which extends substantially the entire height and width of said device. The section 19 is provided with a plurality of columnar chambers, or as termed in the art, "water monkeys" 22 here shown as cross-sectionally square in shape.

For use in the summer or warm weather, the device is provided with a cold water chamber or reservoir 23 shown as forming the head or entire upper portion of the device 10 overlying both of sections 19 and 20. This reservoir is so constructed to contain for instance, one gallon of water or a suitable supply needed, say, for one day under required driving conditions, and may be conveniently refilled with a fresh supply by removing a cap 24 at the top thereof. In operation the water within the reservoir 23 is allowed to gravitate through pipes 25 from the bottom of the reservoir and leading into the top of the columnar chambers 21. Preferably the columnar chambers 21 are of a porous nature or material and as a result of this condition will "sweat" and the water will, through osmosis, appear on the outside thereof and be mixed with the air coming into the device from the outside through the duct 13. Evaporation of this "sweat" cools the chambers and the water therein, in turn cooling the air which is passed thence into the car by way of the duct 14 and circulated by means of forced pressure, such as a fan 26. This assures circulation of a humidified cooled air. Should no humidified cooled air be desired the valve 15 closes the outlet and the air then passes outside the car through the pipe 16.

For obtaining a cooled dry air, utilization may then be made of the section 20 and in this instance I have shown the same as provided with a plurality of upstanding tubes 27 attached to headers 28 at the top and bottom thereof. In the present showing and referring more particularly to Figure 2, the header at the top of the pipes has three separate units and the bottom header has one unit. This particular arrangement has no limiting significance in the present invention as the construction of the said headers may be either of one unit or a plurality of units. In carrying out the invention, the columnar or porous chambers 21 are provided each with an outlet pipe 29 adjacent its lower end enabling the water passing downwardly therethrough from the reservoir 23 to enter the lower header 28. The water circulates upwardly through the tubes 27 into the upper header from whence it may return into the porous chambers through pipes 30 connecting the header and chambers to be again circulated. As will be readily observed, the cooled water passing through the pipes 27 will tend to cool surrounding air without addition of moisture thereto, and since air is coming in from the outside through the duct 13, a proper cooling of dry air takes place and the cooled air then passes out into the car through the duct 14 under forced pressure by utilization of a second power operated fan 31.

To insure a proper and clean air to enter the device from the outside, I have deemed it advisable to employ suitable filtering means 32, which for clarity and simplicity may be a very fine wire mesh, filtering paper, or other suitable filter. By utilization of such means, dust and other finite impurities or objectionable matter will be prevented from entering the device or passing to the interior of the vehicle therethrough.

I claim:

1. An air-conditioning device for automobiles as characterized comprising a substantially rectangular container having an inlet duct for receiving air from the outside and an outlet duct for discharging conditioned air to the interior of said automobile, said container comprising a plurality of sections divided by a partition and having a reservoir on the top thereof for admitting water into one section, said section having a plurality of porous chambers whereby the water passing therethrough from the reservoir will evaporate through the outer walls thereby providing a humid air-condition, the other said section having a plurality of upstanding tubular members having upper and lower headers, a discharge pipe connecting said lower header and said porous chambers and said tubular members at the bottom whereby the water within the porous chambers is permitted to pass out into the lower header and into the tubular members, a second pipe from the said upper header connecting the tubular members and the porous chambers adjacent the upper parts thereof whereby the water may again circulate and mix with the other water coming in from the reservoir, and means at one end of the container for forcing the humidified air created in the porous chamber section out through the outlet duct.

2. An air-conditioning device for automobiles as characterized comprising a substantially rectangular container having an inlet duct for receiving air from the outside and an outlet duct for discharging conditioned air to the interior of said automobile, said container comprising a plurality of sections divided by a partition and having a reservoir on the top thereof for admitting water into the one section, said section having a plurality of porous chambers whereby water passing therethrough from the reservoir will evaporate through the outer walls, the other said section comprising a plurality of upstanding tubular members having upper and lower headers, said porous chambers and headers with the tubular members being interconnected adjacent their lower ends by a pipe for permitting the water from the porous chambers to pass into the said lower header and upwardly through the upright members, the water in the upright members creating a cooled condition to the incoming air from the inlet duct and then discharged through the outlet duct, and means at the one end of the tubular members section for forcing the air out, thereby presenting a dry cooled air-condition to the interior of the said automobile.

3. An air-conditioning device for automobiles as characterized comprising a substantially rectangular container having an inlet duct for receiving air from the outside and an outlet duct for discharging conditioned air to the interior of said automobile, said container comprising a plurality of sections divided by a partition and having a reservoir on the top thereof for admitting water into the one section, said section having a plurality of porous chambers whereby water passing therethrough from the reservoir will evaporate through the outer walls, the other said section comprising a plurality of upstanding tubular members having upper and lower headers, said porous chambers and headers with the tubular members being interconnected adjacent their lower ends by a pipe for permitting the water from the porous chambers to pass into the said lower header and upwardly through the upright members, the water in the upright members creating a cooled condition to the incoming air from the inlet duct and then discharged through the outlet duct, means at the one end of the tubular members section for forcing the air out, thereby presenting a dry cooled air-condition to the interior of the said automobile, and other means for discharging moist air from the porous chambers to the exterior of the automobile.

GORDON D. HARRIS.